United States Patent [19]
Nieberding

[11] Patent Number: 6,105,550
[45] Date of Patent: Aug. 22, 2000

[54] METHOD FOR OPERATION OF A FOUR-STROKE RECIPROCATING INTERNAL COMBUSTION ENGINE

[75] Inventor: Rolf-Günther Nieberding, Fountainbleau, France

[73] Assignee: DaimlerChrysler AG, Stuttgart-Möhringen, Germany

[21] Appl. No.: 09/295,115

[22] Filed: Apr. 19, 1999

[30] Foreign Application Priority Data

Apr. 24, 1998 [DE] Germany ............................ 198 18 596

[51] Int. Cl.$^7$ ............................................. F02B 3/00
[52] U.S. Cl. .................. 123/294; 123/27 R; 123/406.26; 123/568.14
[58] Field of Search ..................... 123/294, 305, 123/526, 620, 568.14, 406.26, 323, 27 GE, 27 R

[56] References Cited

U.S. PATENT DOCUMENTS

| | | | |
|---|---|---|---|
| 4,133,172 | 1/1979 | Cataldo | 123/294 |
| 5,832,880 | 11/1998 | Dickey | 123/294 |
| 5,996,547 | 12/1999 | Machida et al. | 123/305 |
| 6,009,861 | 1/2000 | Kreuter | 123/568.14 |

FOREIGN PATENT DOCUMENTS 19519663  5/1996  Germany.

*Primary Examiner*—John Kwon
*Attorney, Agent, or Firm*—Marc Lorelli

[57] ABSTRACT

The invention concerns a method for operation of a four-stroke reciprocating internal combustion engine with a homogenous lean base mixture of air, fuel and retained exhaust, as well as with compression ignition and direct fuel injection into a combustion chamber with gas displacement devices.

In order to keep the design cost low for this concept, the reciprocating internal combustion engine is operated at partial load with compression ignition and preferably mechanically controlled exhaust retention, whereas operation in the full load and high partial load range occurs as a spark ignition engine.

16 Claims, 3 Drawing Sheets

METHOD FOR OPERATION OF A FOUR-STROKE RECIPROCATING INTERNAL COMBUSTION ENGINE

BACKGROUND AND SUMMARY OF THE INVENTION

The invention concerns a method for operation of a four-stroke reciprocating internal combustion engine with a homogeneous lean base mixture consisting of air, fuel and retained exhaust, as well as with compression ignition and direct fuel injection into a combustion chamber whose volume is varied cyclically and which is fillable through at least one inlet device with fresh gas and whose combustion exhausts can be exhausted through at least one outlet device, at least partially.

Reciprocating internal combustion engines during compression ignition of homogeneous lean mixtures offer the possibility of limited NOx formation with high thermal efficiency. A prerequisite for this is achievement of an optimal ignition temperature in which optimal beginning and running of a self-maintaining combustion is established.

At insufficient temperature of the mixture during compression combustion begins too late and proves incomplete. At unduly high temperatures, steep pressure increases with knocking combustion develop owing to the then self-accelerating combustion.

The optimal ignition temperature can be achieved by variation of compression and/or variation of retention of exhausts from the previous cycle. Variation of these quantities is very complicated with a completely variable valve control system. Moreover, during variation of compression via a variable intake, there is the drawback that the admissible compression and thus filling must be reduced with increasing output so that engine output is limited. Another output limit results from operation with the lean mixture. Using high percentage of exhaust, even a stoichiometric mixture can be burned with compression ignition with avoidance of steep pressure increases and NOx emission, but with the drawback of reduced gas filling and thus power losses.

These shortcomings also apply to DE-A 195 19 663 in which a method is described for operation of an internal combustion engine with compression ignition. In this case a homogeneous and lean air/fuel mixture generated with external mixture formation is compressed in a first stage to close to the ignition limit. In a second stage, an additional mixture of the same fuel is finely atomized and injected into the combustion chamber, avoiding wall contact. The late injected fuel forms a mixture cloud, which is ignited, since its ignition limit lies below the compression temperature achieved in the first stage owing to the higher fuel content.

The underlying task of the invention is to devise a method of the generic type mentioned in the preamble of claim 1 through which low $NO_x$ emission and high efficiency are achieved with the least possible design expense.

The task is solved by a method with the features of claim 1.

By operation with compression ignition at partial load, which predominates in vehicle operation, limited $NO_x$ emission and low consumption are ensured. Effective control of the combustion start and process by mechanically controlled exhaust retention then requires comparatively limited expense. High power is achieved by spark-ignition engine operation at high partial load and full load. This type of load requirement, however, accounts for only a limited part of the total operating time so that the $NO_x$ emission and fuel consumption occurring in this case play a subordinate role. The cost required for this is kept within the usual limits for spark-ignition engines.

The exhaust mass required to control combustion during compression ignition forms in the combustion chamber by combustion of the fuel and air from the supplied fresh mixture. The energy liberated during combustion is taken off by the crankshaft by expansion to the maximum combustion chamber volume. A discharge cross section is then opened and exhaust is discharged by reducing the volume. During the exhaust process, on reduction of the combustion chamber volume, the exhaust valve closes and retains part of the exhaust. The amount of exhaust is compressed again to minimal combustion chamber volume and thus kept thermally active. The necessary mass of exhaust can be retained in the combustion chamber only if the intake valve after compression of the exhaust opens at a volume greater than the volume at which the exhaust valve was closed before compression.

The retained exhaust comes from combustion with an air excess. An amount of fuel that enters into an incipient chemical reaction with the residual air present, which cannot react completely because of the rapid increase in volume, but forms a significant number of chemically active radicals and thus easily ignites the then supplied fresh gas mass during subsequent compression, can be injected into the already expanding, compressed exhaust by means of the prescribed internal mixture formation.

It is not necessary for chemical activation to control the mass of retained exhaust as precisely as for compression ignition without activation. By chemical activation (radical formation), the effect of thermal activation and the ignition-relevant effect of exhaust retention are intensified several-fold. A smaller but distinct valve undercut can therefore be prescribed.

The valve undercut is simply accomplished mechanically with a second cam shape. Switching between an SI engine cam with valve overlap and one with valve undercut is easily accomplished with the so-called VTEC system. The engine can be operated in the full load range and in the region of the upper partial load with the second, adjustable cam form, which corresponds to an SI engine design. To this we add the usual elements in SI engine operation, like constant compression, inlet throttle valve and spark ignition for the homogeneous, stoichiometric mixture. The time cross section for valve lifting with the valve undercut should amount to roughly half the time cross section at full load.

The necessary retained amount of exhaust depends on the activation conditions, which are set as a function of the load and speed according to the conditions of injection and the beginning of chemical reaction. Control of the amount of exhaust via the time cross section is no longer possible with a fixed mechanical cam shape. The required amount of exhaust is not set via the duration of opening or the size of the time window of valve opening, but via the pressure difference between the combustion chamber and the exhaust throttle behind the discharge valve. The exhaust sensor flap required for this purpose controls the pressure difference between the combustion chamber and the exhaust train before the valve closes again for compression of exhaust retention.

The time cross section of the inlet device is much smaller than that of the outlet device. The smaller time cross section of the inlet device is compensated with respect to mass flow rate by the larger pressure difference being adjusted.

Since a valve overlap is not present, but rather a valve undercut in operation with exhaust throttle valves, the pressure state in the exhaust manifold cannot affect the state before the inlet valve. The two gas dynamic regions before and after the combustion chamber remain separated. Load control of operation occurs via adjustment of the exhaust throttle valve. This determines the maximum exhausted mass from the combustion chamber and thus the charging mass taken in for the next combustion stroke.

The exhaust throttle valve can be mounted at the end of the common exhaust manifold or directly behind each outlet device of each individual cylinder. The basic principle remains identical for both systems. An overlap of the exhaust mass from an individual cylinder into the others is not to be expected, since damming up does not occur simultaneously with a significant pressure difference at the relatively high rate of change of the combustion chamber volume.

The exhaust is retained by the exhaust sensor flap by constricting the flow cross section to a higher pressure than the ambient pressure. After the narrowest cross section, the medium is expanded to the surrounding pressure conditions and the density drops. If the exhaust throttle valve is provided with a continuously expanded cross section function over the flow length after the smallest cross section in the direction of flow, the density of the retained exhaust can be changed with avoidance of outflow loss or an expansion jolt. The outflow loss of a noncontinuous pressure and density change over the flowing medium is to be avoided.

The invention is further explained in the following description with reference to the drawings, which shows practical examples of the invention. In the drawing:

DETAILED DESCRIPTION OF THE DRAWINGS

Figure 1:
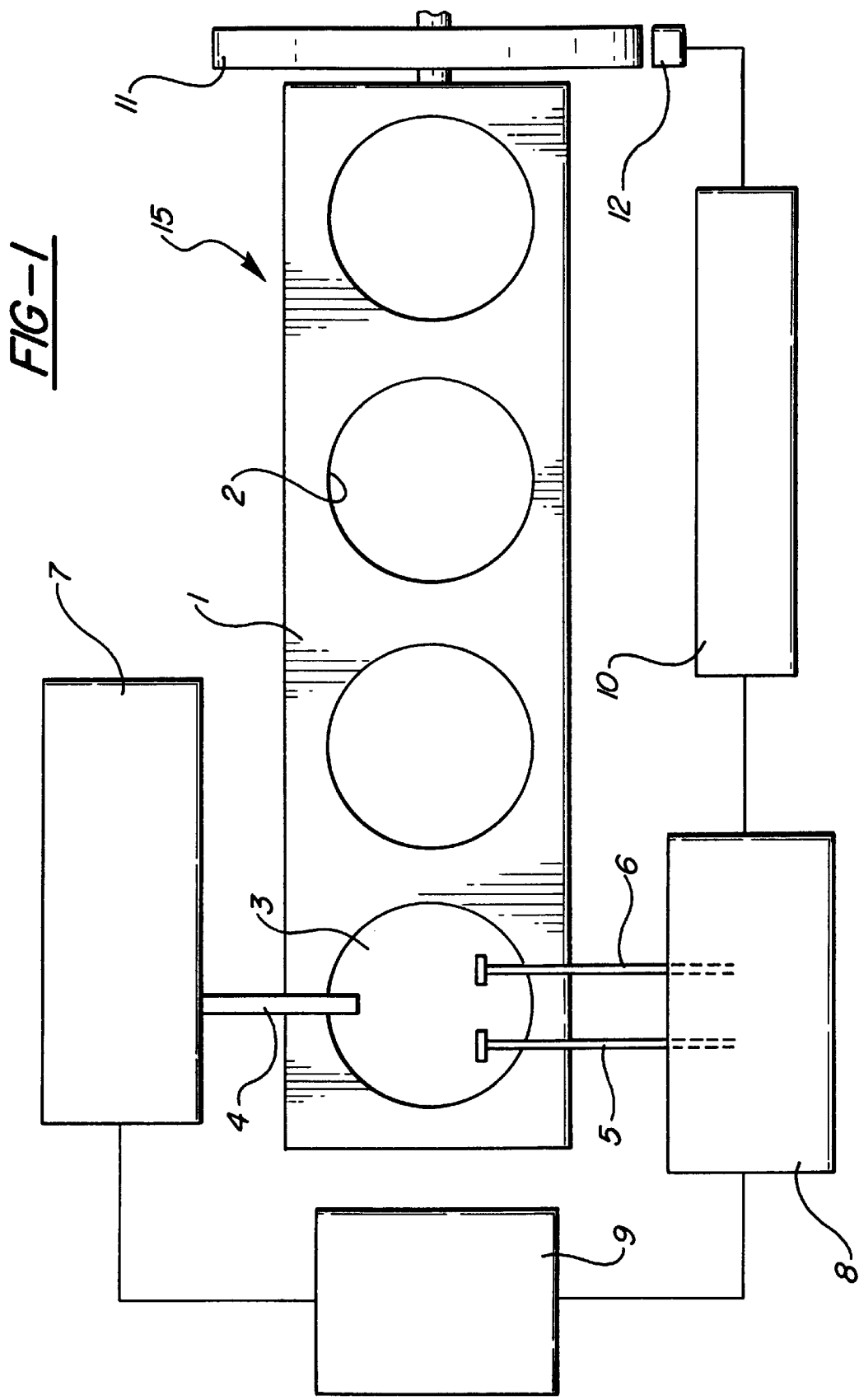
FIG. 1 shows a schematic view of a reciprocating internal combustion engine with a control device for mechanical exhaust retention and for injection activation, as well as with means for combustion analysis.

An internal combustion engine 15 depicted schematically in FIG. 1 comprises a cylinder block 1 with four cylinders 2, in which pistons are mounted tightly and which are closed by a cylinder head. Cylinders 2, pistons and cylinder head enclose a combustion chamber 3 in which combustion occurs. One fuel injection valve 4, one inlet device 5 and one outlet device 6 per combustion chamber 3 are present in the cylinder head. The fuel injection valve 4 is opened and closed by an injection activation 7. The area designated with mechanical exhaust retention 8 comprises an activation device for the gas displacement devices 5, 6. Depending on the employed system, one or more cam shafts with phase adjusters, switchable cup tappets with variable valve lift limitation or roller drag levers with variable coupling point, as well as different cams with a switching system similar to the so-called VTEC system and at least one exhaust throttle valve also belong to this. For spark-ignition engine operation an inlet throttle valve (not shown) and a spark ignition are also provided.

A control device 9 controls the opening and closing process of the fuel injection valve 4 and the gas change devices 5, 6.

Combustion is monitored with a torque analyzer 10, which detects the rotational uniformity of the crankshaft on the periphery of a flywheel 11 by means of a speed sensor 12 and sends it to the control device 9. An ion current probe can additionally be used in combustion chamber 3 or a knock sensor on cylinder block 1 for combustion evaluation. All these sensors provide real-time signals to control device 9 concerning the position and course of combustion, which causes control of the fuel injection valves 4 and the gas displacement devices 5, 6 with consideration of these values.

Figure 2:
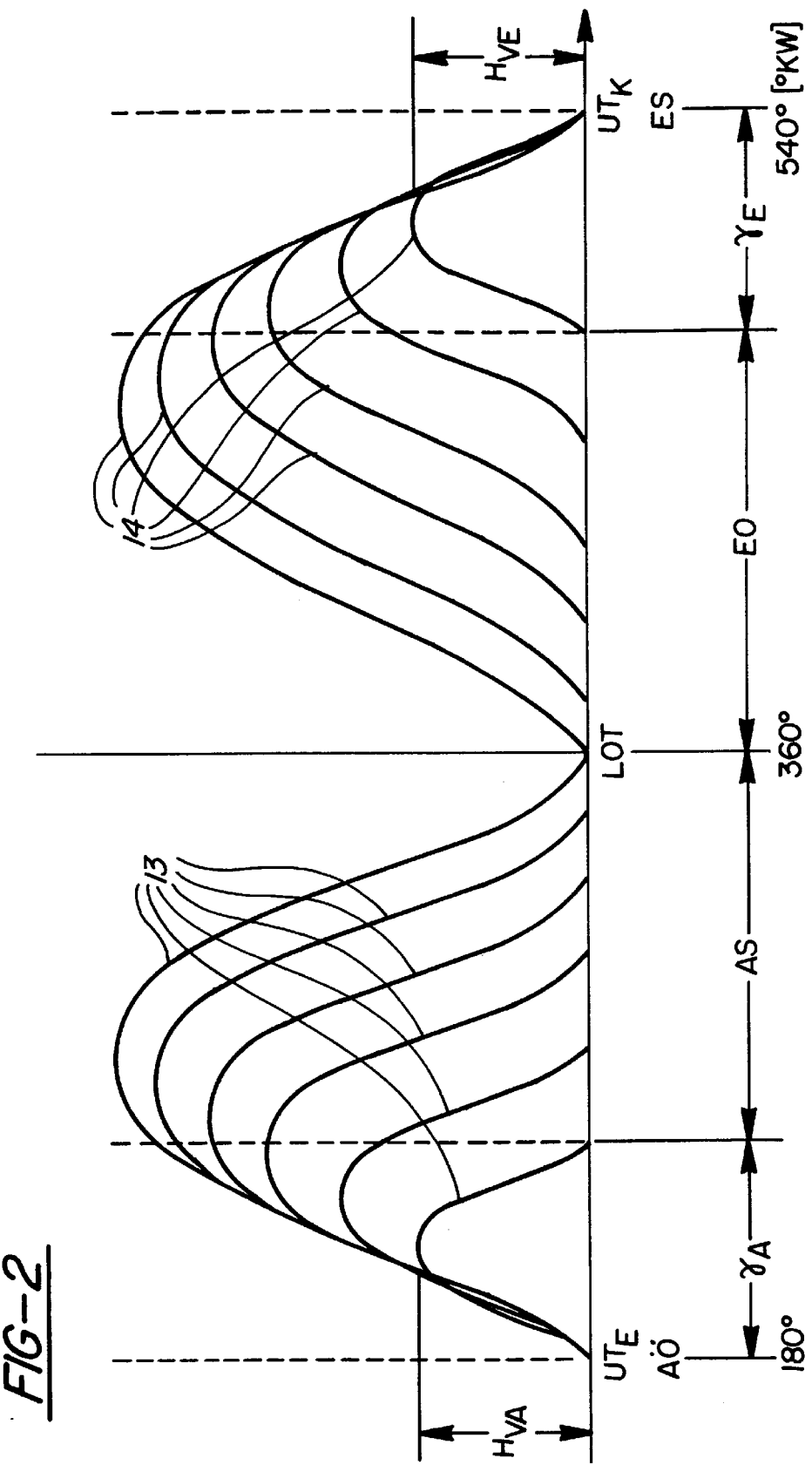
FIG. 2 shows different valve lift curves over the crank angle with stepless mechanical change of the time cross section of the gas displacement device.

FIG. 2 shows different outlet valve lift curves 13 of outlet device 6 and different inlet valve lift curves 14 of the inlet device 5, in which the gas displacement devices 5, 6 have a mechanical drive with a continuous change of the time cross section. The valve lift curves 13, 14 are plotted via crank angle CA. The depicted crank angle CA includes the region of the exhaust stroke (from bottom dead center of expansion $BDC_E$ to top dead center of the charge change $TDC_C$) and the intake stroke (from $TDC_C$ to the bottom dead center of compression $BDC_C$). The valve lift curves 13, 14 have different opening an, $\gamma_o \gamma_i$ and different maximum valve lifts $H_{VO}$, $H_{VI}$ adjusted to them. All valve lift curves 13, 14 are similar because of this. The outlet valve lift curves 13 all begin at bottom dead center of expansion $BDC_E$, the inlet valve lift curves 14 all end at bottom dead center of compression $BDC_C$. The valve lift curves 13, 14 are arranged in pairs, in which the opening angle $\gamma_O$ of the outlet valve lift curve 13 is greater than the opening angle $\gamma_I$ of the corresponding inlet valve curve 14.

All valve lift curves 13, 14 avoid valve overlap, i.e., the outlet device 6 always closes before opening of inlet device 5. Moreover, the time cross sections for the charge change devices 5, 6 in operation with compression ignition and exhaust retention are chosen so that exhaust retained in combustion chamber 3 cannot be forced back through the inlet valves.

Some examples are given below of adjustment of the outlet closure OC at constant outlet opening OO and inlet start IO at constant inlet closure IC in engine operation:

Limited load, lean air/fuel mixture:
OC: early—only little exhaust is extracted from the combustion chamber,
IO: late—long expansion owing to the large amount and temperature of the exhaust, which can be overexpanded, leads to good mixing of the fresh gas in the exhaust,
higher load, roughly stoichiometric air/fuel mixture:
OC: late—much exhaust must be replaced with fresh mixture,
IO: early—the high amount of inflowing gas ensures good mixing,
increasing speed:
OC: tends to be later, since with increasing speed, the wall heat loss diminishes, the compression process leads to a higher gas temperature, less residual gas is necessary,
IO: tends to be earlier, the higher velocity and speed lead to sufficiently good mixing.

Figure 3:
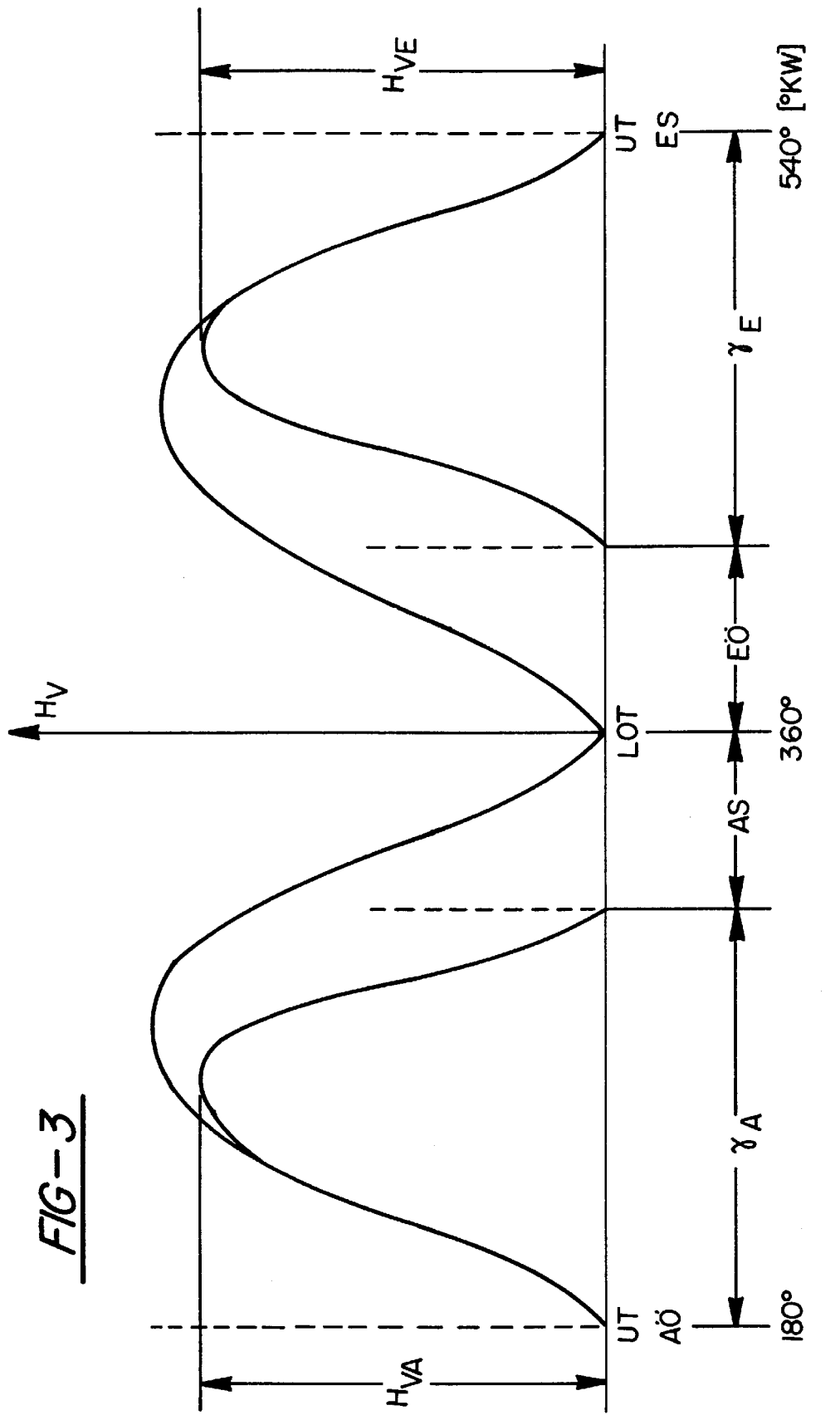
FIG. 3 shows valve lift curve over the crank angle with a two-stage mechanical change of the time cross section of the gas displacement device.

FIG. 3, like FIG. 2, shows individual valve lift curves 13, 14 of an outlet device 5 and an inlet device 6, which, however, have a two-stage mechanical drive through two different separately activatable cams. The other features, like similarity of the curves, same outlet start OO and same inlet closure IC, opening angle $\gamma_O$ of the outlet valve lift curve 13 greater than the opening angle $\gamma_I$ of the corresponding inlet valve lift curve 14 and the lack of overlap of the valve lift curves 13, 14 correspond to those of FIG. 2.

The time cross sections of the valve lift curves of both stages behave as 2:1. A continuous change in retained amount of exhaust is achieved in this system by throttling the exhaust stream in the exhaust collection line or after the individual outlet devices 6, in which the latter solution responds particularly rapidly to altered operating conditions.

Activation fuel can be injected into the retained, compressed exhaust, which, at a late injection point, leads to formation of radicals and with an early injection point leads to a temperature increase of the exhaust by its ignition. The amount can be reduced by activation of the retained exhaust.

The exhaust throttling and exhaust activation used to control compression emission can also be applied during continuous variation of the time cross section of the gas displacement devices 5, 6.

The full load and high partial load range is implemented in each case by spark ignition engine operation. For this purpose an intake air throttle valve, a foreign ignition unit, as well as valve overlap and a stoichiometric air/fuel mixture are additionally required.

Qualitative examples of engine operation with two-stage adjustment of the time cross section, with exhaust throttling and exhaust activation and foreign ignition are listed below:

Limited load, limited speed.
- Intake throttle valve: completely open.
- Cam form: valve undercut.
- Injection: early in the exhaust, exhaust not too hot and limited amount, many radicals with not unduly strong mixing.
- Ignition: compression ignition.
- Exhaust throttle valve: mostly closed, higher amount of exhaust, limited throughput.

Limited load, high speed.
- Intake throttle valve: completely open.
- Cam form: valve undercut.
- Injection: early in the exhaust, exhaust not too hot and limited amount, good mixing.
- Ignition: compression ignition.
- Exhaust throttle valve: somewhat less closed, high amount of exhaust, higher throughput.

Medium load, low speed.
- Intake throttle valve: completely open.
- Cam form: valve undercut.
- Injection: later, still in the exhaust, because exhaust is hotter and large amount of fuel (soot hazard).
- Ignition: compression ignition.
- Exhaust throttle valve: somewhat less closed, lower throughput, less exhaust for ignition required owing to higher exhaust temperatures.

Medium load, high speed.
- Intake throttle valve: fully open.
- Cam form: valve undercut.
- Injection: still in the exhaust, many radicals, because exhaust is hotter and larger amount of fuel, good mixing.
- Ignition: compression ignition.
- Exhaust throttle valve: open, higher throughput, high exhaust temperatures.

High load, all speeds.
- Intake throttle valve: fully open, partial load control.
- Cam form: valve overlap
- Injection: suction stroke.
- Ignition: spark ignition.
- Exhaust throttle valve: fully open.

While the above description constitutes the preferred embodiment of the invention, it will be appreciated that the invention is susceptible to modification, variation, and change without departing from the proper scope or fair meaning of the accompanying claims.

What is claimed is:

1. A method for operation of a four-stroke reciprocating internal combustion engine with a homogeneous lean basic mixture of air, fuel and retained exhaust, the engine being capable of direct fuel injection and compression ignition within a combustion chamber whose volume is cyclically varied, the combustion chamber being: fillable through at least one inlet device with fresh gas; capable of withstanding the combustion of gases; and capable of discharging the combustion exhausts through at least one outlet device, said inlet and outlet device having a variable time cross section, said engine having lower load range, a middle partial load range, a high partial load range, and a full load range, said method comprising the steps of:

operating the reciprocating internal combustion engine as a compression ignition engine in the lower and middle partial load range; and operating the reciprocating internal combustion engine as a spark-ignition engine in the full load and high partial load range.

2. The method according to claim 1, further comprising the step of:

controlling operation of said reciprocating internal combustion engine as a compression ignition engine in the lower and middle partial load range by mechanical exhaust retention.

3. The method according to claim 2, further comprising the step of:

determining time and process of combustion during said compression ignition by either an amount and reactivity of the retained exhaust or temperature of the retained exhaust; and determining time and process of combustion by spark ignition while the engine is operating as a spark-ignition engine.

4. The method according to claim 1, further comprising the step of:

varying said retained exhaust either by variation of said time cross sections of said inlet device and said outlet device or by variation of exhaust counterpressure.

5. The method according to claim 4, further comprising the step of:

varying said time cross sections of said inlet and outlet devices continuously by adjusting phase adjusters of at least one cam shaft and by controllable cup tappets with valve lift limitation.

6. The method according to claim 5, further comprising the step of:

varying said time cross sections of said inlet and outlet devices continuously by changing a coupling point of a roller drag lever.

7. The method according to claim 5, further comprising the step of:

varying said time cross sections of said inlet and outlet devices in two stages by switching to different cams.

8. The method according to claim 5, wherein said time cross sections of said inlet and outlet devices for spark ignition and compression ignition operation are in at least a 2:1 ratio.

9. The method according to claim 5, wherein said time cross sections of the outlet device are greater than those of the inlet device during said compression operation.

10. The method according to claim 5, further comprising the step of:

throttling the exhaust stream either in an exhaust manifold or after each outlet device.

11. The method according to claim 10, wherein said exhaust stream is expanded t ambient pressure after a narrowest cross section of each exhaust throttle in a continuously widening cross section.

12. The method according to claim 3, further comprising the step of varying reactivity and temperature of the exhaust retained in said combustion chamber by an amount and time of an activation fuel injected therein.

13. A method for operation of a four-stroke reciprocating internal combustion engine with a homogeneous lean basic mixture of air, fuel and retained exhaust, the engine being capable of direct fuel injection and compression ignition within a combustion chamber whose volume is cyclically varied by a piston, the combustion chamber being: fillable through at least one inlet device with fresh gas; capable of withstanding the combustion of gases; and capable of discharging the combustion exhausts through at least one outlet device, said inlet and outlet device having a variable time cross section, said engine having lower load range, a middle partial load range, a high partial load range, and a full load range, said method comprising the steps of:

operating the reciprocating internal combustion engine in a first regime as a compression ignition engine in the lower and middle partial load range;

operating the reciprocating internal combustion engine in a second regime as a spark-ignition engine in the full load and high partial load range; and varying said time cross sections of said inlet and outlet devices between said first regime and said second regime.

14. The method according to claim 13, further comprising the steps of:

varying the closing of said outlet device between said first and second regime;

varying the opening of the inlet device between said first and second regime;

opening the outlet device at or near bottom dead center of expansion of said piston; and closing said inlet device at or near the bottom dead center of compression of said piston.

15. The method according to claim 14, wherein said inlet device comprises at least one valve and said outlet device also comprises at least one valve.

16. The method according to claim 15, further comprising the steps of:

varying maximum lift of said valves of said inlet and outlet devices between said first and second regime.

\* \* \* \* \*